(12) United States Patent
Yu

(10) Patent No.: US 7,352,225 B1
(45) Date of Patent: Apr. 1, 2008

(54) DC OFFSET REDUCTION CIRCUIT AND METHOD

(75) Inventor: Qian Yu, Santa Clara, CA (US)

(73) Assignee: Scintera Networks, Inc., Sunnyvale, CA (US)

( * ) Notice: Subject to any disclaimer, the term of this patent is extended or adjusted under 35 U.S.C. 154(b) by 45 days.

(21) Appl. No.: 11/164,180

(22) Filed: Nov. 14, 2005

(51) Int. Cl.
*H03L 5/00* (2006.01)

(52) U.S. Cl. ............... 327/307; 455/234; 375/296

(58) Field of Classification Search ............... 327/307
See application file for complete search history.

(56) References Cited

U.S. PATENT DOCUMENTS

| | | | | |
|---|---|---|---|---|
| 6,498,929 B1 * | 12/2002 | Tsurumi et al. | ............ | 455/296 |
| 6,553,081 B1 * | 4/2003 | Goodson | ............ | 375/296 |
| 6,642,767 B2 * | 11/2003 | Wang | ............ | 327/307 |
| 6,700,514 B2 * | 3/2004 | Soltanian et al. | ............ | 341/118 |

* cited by examiner

*Primary Examiner*—Quan Tra
*Assistant Examiner*—Khareem Almo
(74) *Attorney, Agent, or Firm*—Vedder Price P.C.

(57) ABSTRACT

A circuit and method for reducing the DC offset in a signal produced by the mixing of two AC signals.

2 Claims, 2 Drawing Sheets

DC OFFSET REDUCTION CIRCUIT AND METHOD

BACKGROUND OF THE INVENTION

1. Field of the Invention

The present invention relates to analog compensation circuitry for digital circuits, and in particular, to analog compensation circuits and methods for reducing DC offset voltages.

2. Description of the Related Art

Referring to FIG. 1, conventional high-speed analog adaptive equalizers, such as the three-tap feed-forward equalizer (FFE) illustrated here, use analog multipliers in performing least-mean-square (LMS) adaptation. The incoming digital data signal s0(t) at lead 11 is sequentially delayed by delay elements 12a, 12b (e.g., each imparting a delay equivalent to one data symbol), thereby producing two sequentially delayed signals s1(t) and s2(t) at leads 13a and 13b, respectively. The original s0(t) and delayed s1(t), s2(t) signals are multiplied with coefficient signals C0, C1 and C2 provided via leads 25a, 25b and 25c, respectively, in signal multipliers 14a, 14b, 14c. The resulting product signals are conveyed via leads 15a, 15b and 15c and summed in a summing circuit 16. The resulting sum signal is conveyed via lead 17 and sliced by a signal slicer 18 and subtracted from the sliced signal provided at lead 19 in a differential summing circuit 20. The resulting signal on lead 21 is an error signal e(t) representing the error, or difference, between the pre-slice signal on lead 17 and post-slice signal on lead 19. This error signal e(t) is multiplied in analog mixing circuits 22a, 22b, 22c with the original s0(t) and delayed s1(t), s2(t) data signals. The resulting product signals are conveyed via leads 23a, 23b and 23c and filtered with low-pass filters 24a, 24b, 24c to produce the coefficient signals C0, C1 and C2 on leads 25a, 25b and 25c, respectively.

A common problem with such circuits, particularly in an integrated circuit (IC) implementation, is that of DC offset voltages. For example, the error signal e(t), as well as the data signals s0(t), s1(t), s2(t), should have zero mean values, i.e., zero volts DC, and the analog multiplier output signals on leads 23a, 23b and 23c should be exactly proportional to the product of the error signal e(t) and the respective data signals s0(t), s1(t), s2(t). However, particularly for deep-submicron analog integrated circuits using complementary metal oxide semiconductor (CMOS) technology, this is not true.

SUMMARY OF THE INVENTION

In accordance with the presently claimed invention, a circuit and method are provided for reducing the DC offset in a signal produced by the mixing of two AC signals.

As discussed in more detail below, when mixing a data signal with an error signal to generate adaptive coefficients, e.g., for an analog adaptive equalizer using LMS adaptation, the error signal power is typically much smaller than the data signal power since the purpose of the LMS adaptation is to minimize the error signal power. Accordingly, the dominant source of output offset is related to the data signal power which does not change with the coefficient adaptation. In accordance with the presently claimed invention, the error signal is turned off while a variable compensation signal which is added to the mixed signal is swept across its range of values (e.g., minimum to maximum) to determine a compensation signal value at which the output offset voltage component is minimized. That compensation signal value is then maintained while the error and data signals are mixed as part of the LMS adaptation process. As a result, a significant advantage of the presently claimed invention is more effective minimization of an output offset voltage component by the introduction of a compensation signal which is more directly related to the input signal level.

In accordance with one embodiment of the presently claimed invention, DC offset reduction circuitry includes signal mixing circuitry, signal summing circuitry and signal filter circuitry. The signal mixing circuitry is responsive to reception of first and second AC input signals having mutually lower and higher magnitudes, respectively, by providing a product signal having a magnitude with a first DC component and a first plurality of signal components related to the first and second AC input signals. The signal summing circuitry is coupled to the signal mixing circuitry and responsive to the product signal and a DC compensation signal by providing a sum signal having a magnitude with a second DC component and the first plurality of signal components related to the first and second AC input signals. The signal filter circuitry is coupled to the signal summing circuitry and responsive to the sum signal by providing an output signal having a magnitude with a third DC component and a second plurality of signal components related to the first and second AC input signals. The DC compensation signal has a magnitude related to a sum of the first DC component and at least one of the second plurality of signal components related to the second AC input signal, and the third DC component is approximately zero.

In accordance with another embodiment of the presently claimed invention, DC offset reduction circuitry includes signal mixer means, signal summer means and signal filter means. The signal mixer means is for receiving and mixing first and second AC input signals having mutually lower and higher magnitudes, respectively, to provide a product signal having a magnitude with a first DC component and a first plurality of signal components related to the first and second AC input signals. The signal summer means is for summing the product signal and a DC compensation signal to provide a sum signal having a magnitude with a second DC component and the first plurality of signal components related to the first and second AC input signals. The signal filter means is for filtering the sum signal to provide an output signal having a magnitude with a third DC component and a second plurality of signal components related to the first and second AC input signals. The DC compensation signal has a magnitude related to a sum of the first DC component and at least one of the second plurality of signal components related to the second AC input signal, and the third DC component is approximately zero.

In accordance with still another embodiment of the presently claimed invention, a method for reducing a DC offset voltage in a product signal resulting from mixing a plurality of AC signals includes:

mixing first and second AC input signals having mutually lower and higher magnitudes, respectively, to produce a product signal;

summing the product signal with a variable DC signal to produce a sum signal; and filtering the sum signal to produce an output signal having a DC component and a plurality of signal components;

wherein during a first time interval the first AC input signal magnitude is approximately zero and the variable DC signal is controlled to have a plurality of magnitudes in a sequence, during the first time interval one of the plurality of variable DC signal magnitudes corresponds to a minimum magnitude of the output signal DC component, and during a second time interval the first AC input signal magnitude is nonzero and the variable DC signal is controlled to have the one of the plurality of variable DC signal magnitudes.

DETAILED DESCRIPTION

Figure 1:
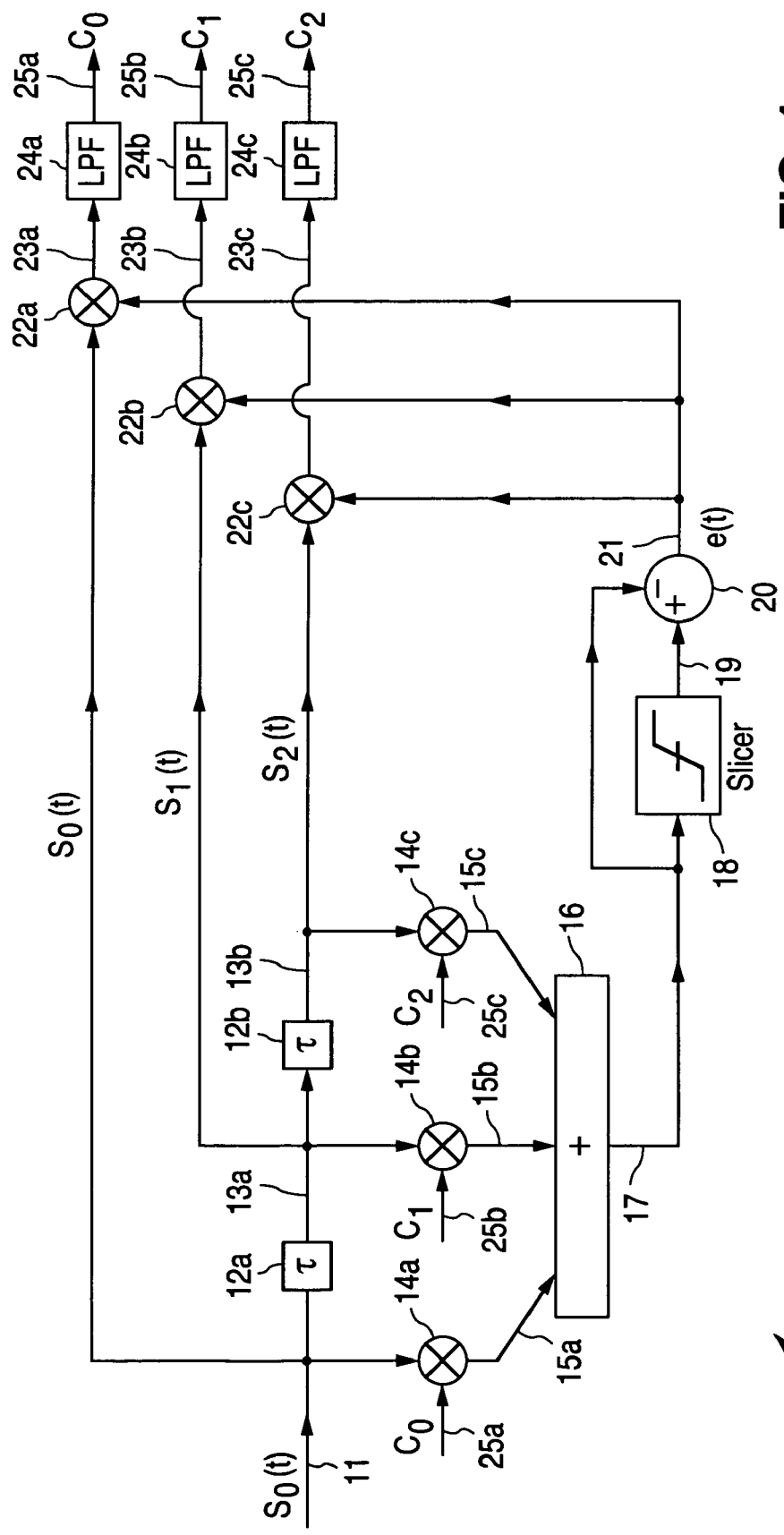
FIG. 1 is a schematic diagram of a conventional three-tap feed-forward equalizer.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

A mathematical model of analog multipliers (i.e., mixers) can be used to analyze the problem of DC offset voltages. With E(t) as the AC component of the error signal, and S(t) as the AC component of the data signal, the analog mixer output, including up to third order harmonic terms, can be expressed according to Equation 1.

$$V = V_0 + (a_1 E + a_2 S) + (b_1 E^2 + b_2 ES + b_3 S^2) + (c_1 E^3 + c_2 E^2 S + c_3 ES^2 + c_4 S^3) \quad (1)$$

For an ideal analog multiplier, only the product term $b_2 ES$ is needed, since all the other terms should have negligible values by comparison. For LMS adaptation, only the low-pass filtered mixer output is of interest, and can be expressed according to Equation 2 (where <X> designates low-pass filtering, or averaging over time, of signal X).

$$<V> = V_0 + b_1 <E^2> + b_2 <ES> + b_3 <S^2> \quad (2)$$

By comparing Equations 1 and 2, a number of observations can be made. The first and third order terms are removed by the low-pass filtering, and the static DC Offset voltage $V_0$ and second order terms $b_1 <E^2>$ and $b_3 <S^2>$ can significantly affect the LMS adaptation. Additionally, the static offset voltage $V_0$ can be measured when both the error and data signals are turned off, i.e., the output offset of the multiplier equals the static offset voltage $V_0$ when E=0 and S=0. If the error signal is turned off and the data signal is active, the output offset voltage will equal the sum of the static offset voltage $V_0$ and the second order signal term $b_3 <S^2>$. If the data signal is turned off and the error signal is active, the output offset voltage equals the sum of the static offset voltage $V_0$ and the second order error term $b_1 <E^2>$. However, the error signal power $<E^2>$ is typically much smaller than the data signal power $<S^2>$ due to the fact that the purpose of the LMS adaptation is to minimize the error signal power $<E^2>$. Accordingly, the dominant source of output offset is $V_0 + b_3 <S^2>$ which does not change with coefficient adaptation.

Figure 2:
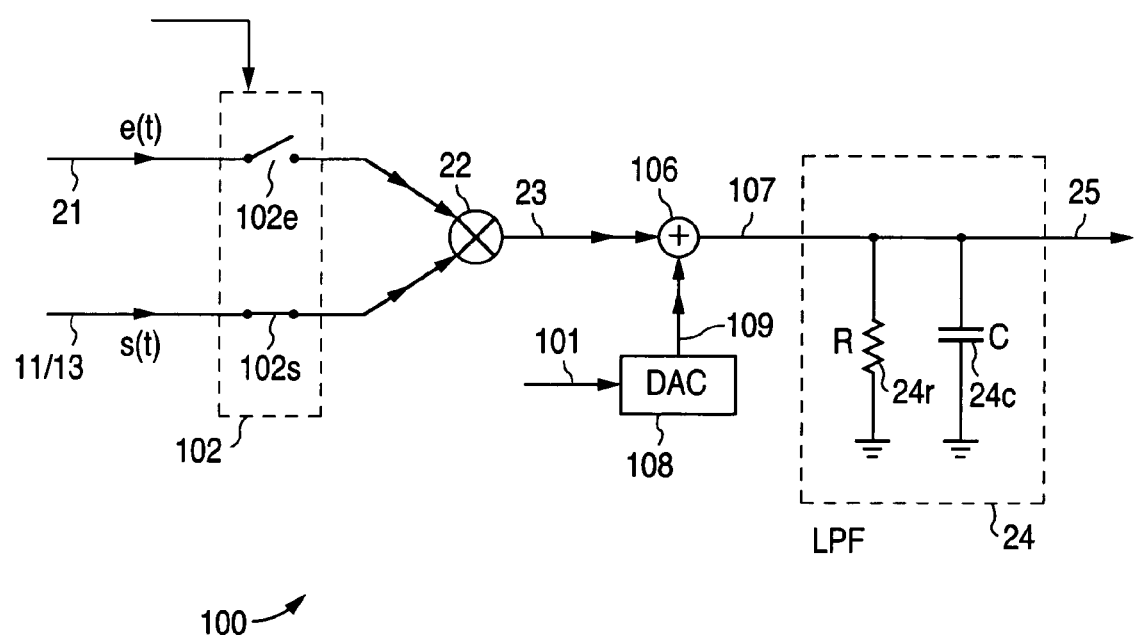
FIG. 2 is a schematic diagram of a DC offset reduction circuit in accordance with one embodiment of the presently claimed invention.

Referring to FIG. 2, offset cancellation in accordance with the foregoing discussion can be accomplished using a circuit 100 implemented substantially as shown. The data signal s(t) from lead 11 or 13 and error signal e(t) are received by the mixer 22 via a switching circuit 102 which includes a switch 102e for the error signal e(t) and, if desired, a switch 102s for the data signal s(t). In accordance with a preferred embodiment, the mixer 22 is a four-quadrant analog multiplier (e.g., a Gilbert multiplier which is well known in the art). The multiplier output signal at lead 23 (e.g., a current) is summed with a variable signal received via lead 109 (e.g., another current) in a signal summing circuit 106. The variable signal at lead 109 is provided by a digital-to-analog-converter (DAC) 108, which converts a digital control signal received via lead 101 to the analog variable signal at lead 109. The resulting sum signal at lead 107 is filtered in a low-pass filter 24 (e.g., implemented using a shunt resistance 24r and shunt capacitance 24c) to produce the low-pass filtered output voltage on lead 25.

To effectively cancel the offset voltage component of the output signal on lead 25, the error signal e(t) is turned off using switch 102e, and the variable signal at lead 109 is swept across its range of values (e.g., minimum to maximum) to determine a signal value at which the output offset voltage component is zero, or at least at its minimum value. Once that value of variable signal at lead 109 is determined, the input control signal at lead 101 can be maintained at its corresponding value, following which the error signal e(t) is enabled by closing the switch 102e, thereby allowing LMS adaptation to proceed (FIG. 1).

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including DC offset reduction circuitry, comprising:

switching circuitry responsive to a control signal by alternately allowing and interrupting conveyance of at least one of first and second AC input signals having mutually lower and higher magnitudes, respectively;

signal mixing circuitry coupled to said switching circuitry and responsive to reception of said first and second AC input signals by providing a product signal having a magnitude with a first DC component and a first plurality of signal components related to said first and second AC input signals, wherein said signal mixing circuitry comprises Gilbert multiplier circuitry;

signal summing circuitry coupled to said signal mixing circuitry and responsive to said product signal and a DC compensation signal by providing a sum signal having a magnitude with a second DC component and said first plurality of signal components related to said first and second AC input signals; and signal filter circuitry coupled to said signal summing circuitry and responsive to said sum signal by providing an output signal having a magnitude with a third DC component and a second plurality of signal components related to said first and second AC input signals;

wherein said DC compensation signal has a magnitude related to a sum of said first DC component and at least one of said second plurality of signal components related to said second AC input signal, and said third DC component is approximately zero.

2. A method for reducing a DC offset voltage in a product signal resulting from mixing a plurality of AC signals, comprising:

mixing first and second AC input signals having mutually lower and higher magnitudes, respectively, to produce a product signal by multiplying said first and second AC input signals with a Gilbert multiplier;

summing said product signal with a variable DC signal to produce a sum signal; and filtering said sum signal to produce an output signal having a DC component and a plurality of signal components;

wherein during a first time interval said first AC input signal magnitude is approximately zero and said variable DC signal is controlled to have a plurality of magnitudes in a sequence, during said first time interval one of said plurality of variable DC signal magnitudes corresponds to a minimum magnitude of said output signal DC component, and during a second time interval said first AC input signal magnitude is nonzero and said variable DC signal is controlled to have said one of said plurality of variable DC signal magnitudes.

* * * * *